United States Patent [19]

Tatsukami et al.

[11] 4,205,148

[45] May 27, 1980

[54] DYEABLE POLYOLEFIN COMPOSITION

[75] Inventors: Yoshiharu Tatsukami, Niihama; Hazime Nishibara, Shonaimachi; Yasutoshi Kobayashi, Niihama; Hideo Shinonaga, Nakasonemachi, all of Japan

[73] Assignee: Sumitomo Chemical Co., Ltd., Osaka, Japan

[21] Appl. No.: 33,403

[22] Filed: Apr. 26, 1979

Related U.S. Application Data

[62] Division of Ser. No. 866,402, Dec. 30, 1977, Pat. No. 4,166,079.

[30] Foreign Application Priority Data

Jan. 4, 1977 [JP] Japan .................................. 52-281
Jan. 4, 1977 [JP] Japan .................................. 52-282
Dec. 1, 1977 [JP] Japan .............................. 52-144795

[51] Int. Cl.$^2$ .............................................. C08D 8/32
[52] U.S. Cl. ..................................... 525/379; 525/380
[58] Field of Search ........................... 526/52.2, 52.3

[56] References Cited

U.S. PATENT DOCUMENTS

| 3,305,603 | 2/1967 | McIntyre et al. .................... 526/52.5 |
| 3,320,226 | 5/1967 | Cappriccio et al. ................. 526/52.2 |

FOREIGN PATENT DOCUMENTS 4751836  5/1969  Japan ...................................... 526/52.2

*Primary Examiner*—William F. Hamrock
*Attorney, Agent, or Firm*—Wenderoth, Lind & Ponack

[57] ABSTRACT

A method for producing aminated copolymers by aminating ethylene-glycidyl acrylates copolymers, which comprises conducting the amination in a heterogeneous system using a mixed solvent of an amine and a lower alcohol, and a dyeable polyolefin composition comprising the said aminated copolymer and polyolefin.

8 Claims, No Drawings

DYEABLE POLYOLEFIN COMPOSITION

This application is a divisional application of application Ser. No. 866,402, filed Dec. 30, 1977, now U.S. Pat. No. 4,166,079.

The present invention relates to a method for producing aminated ethylene-glycidyl acrylates copolymers and to a polyolefin composition of an improved dyeability comprising said aminated copolymers and a polyolefin. More particularly, it relates to a method for producing aminated ethylene-glycidyl acrylates copolymers without occurrence of crosslinking in the said copolymers which comprising aminating ethylene-glycidyl acrylates copolymers in a heterogeneous system comprising the copolymers and a mixed solvent of an amine and a lower alcohol, and to a polyolefin composition comprising said aminated copolymers and a polyolefin.

It is well known that polyolefins such as crystalline polypropylene or polyethylene can be formed into fibers, films and other processed materials having excellent physical and mechanical properties. Since, however, the polyolefins have drawbacks inherent to themselves, there is a considerable limitation in using them as they are for the production of processed materials for general purposes. For example, since the polyolefins themselves are both hydrophobic and chemically inert, common dyeing methods are difficultly applied to them, and they can not be dyed a deep color having excellent fastnesses to light, washing and dry cleaning. Consequently, an improvement in the dyeability of polyolefins has so far been an important object of study and many processes have been proposed. A noticeable and useful process among them is the addition of a substance having a dye-affinity to polyolefin, and in fact this process is recommended. But, additives conventionally used in this process are generally low in compatibility with polyolefin so that a remarkable phase separation occurs when they are mixed with the polyolefin. Such conventional additives are only dispersed in a granular form in polyolefin and therefore it is difficult to obtain a homogeneous composition. The resulting polyolefin composition, wherein the additives added for improvement in dyeability are dispersed in a coarse particle form, are extremely low in dyeability, and moreover they cause several troubles on the melt spinning as compared with polyolefin compositions which are in a solid solution state or near thereto. For example, spun fibers are broken at the outlet of a spinning nozzle, and drawing property or physical properties of the fibers are deteriorated. Furthermore, when the fibers are rubbed during drawing or subsequent processes, the additives in a remarkable phase separation state separate from the polyolefin to exert adverse effects such as unevenness in dyeing.

Hitherto, attempts have been made to obtain polyolefin compositions of good dyeability using an aminated glycidyl copolymer resulting from amination of a glycidyl copolymer. For example, there are disclosed a method for producing polyolefin compositions of good dyeability, wherein a styrene-glycidyl methacrylate copolymer is formed into fibers together with isotactic polypropylene by a mixed spinning and the fibers are reacted with an amine such as diethanolamine, monoethanolamine or diethylamine (Kubota et al., Kōgyō Kagaku Zasshi 66, (5), 203 (1963)); and a method of Japanese Patent Publication No. 6989/1965. According to these known methods, however, the amination is applied not to the glycidyl copolymer itself but to the polyolefin compositions which are more voluminous than the glycidyl copolymer, and therefore the amination vessel and its accompanying equipment necessarily become large-sized undesirably. Moreover, since the polyolefin compositions are of a fibrous form, they should be re-formed irrespective of their good dyeability obtained with effort when used in other forms than the fibrous form.

Such disadvantages may be improved by aminating the glycidyl copolymer prior to the mixing with the polyolefin.

Hitherto, amination of ethylene-glycidyl acrylates copolymers is generally carried out by dissolving the copolymers in a good solvent such as toluene or xylene and adding an amine such as diethylamine thereto. This method is not however desirable industrially in terms of economy, because after the amination is finished a poor-solvent such as methanol or ethanol is required in a large amount to precipitate the resulting aminated copolymers from the reaction system and to wash the remaining amine out of the separated aminated copolymer. Further, in this amination method of a homogeneous system comprising the copolymer, the good solvent and the amine, the resulting aminated copolymer becomes partially insoluble in the good solvent, in other words it crosslinks. Such aminated copolymer is hardly dissolved or melted and therefore can not be dispersed almost uniformly in polyolefin to obtain a desirable polyolefin composition of good dyeability.

As a result of extensive studies on a method for aminating ethylene-glycidyl acrylates copolymers without crosslinking, the present inventors have found that a desired aminated copolymer is obtained industrially advantageously without occurrence of the crosslinking, by amination in a heterogeneous system comprising the copolymer to be aminated and a mixed solvent of an amine and a lower alcohol. Moreover, aftertreatments such as separation, recovery and washing of the desired product are markedly simplified.

The present invention provides a method for producing aminated ethylene-glycidyl acrylates copolymers by amination of ethylene-glycidyl acrylates copolymers, which comprises conducting the amination in a heterogeneous system comprising the ethylene-glycidyl acrylates copolymer in a powdery, granular or pellet form and a mixed solvent of an amine and a lower alcohol, to the extent that not less than 90% of epoxy groups present in the copolymers is aminated, and also provides a dyeable polyolefin composition comprising the said aminated copolymer.

In the present invention, the term "amination" means a conversion of the glycidyl acrylates present in the copolymer into hydroxy-aminopropyl acrylates.

In carrying out the method of the present invention, the volume ratio at room temperature (about 20° C.) of amine to lower alcohol (referred simply to as A/S hereinafter) is 20/80 to 85/15, preferably 30/70 to 70/30; and the amount of mixed solvent used is 1 to 100 parts by weight, preferably 2 to 50 parts by weight based on 1 part by weight of the copolymer to be aminated.

When the A/S ranges from 85/15 to 100/0, the amination of epoxy groups in the copolymer proceeds very slowly and it takes a long period of reaction time for almost complete amination of the epoxy groups, which is not advantageous industrially, and the resulting aminated copolymer forms a gel on its separation from the mixed solvent and a drying step, which is undesirable from the standpoint of aftertreatment. Within the range of 0/100 to 20/80, on the other hand, the crosslinking reaction also takes precedence of the amination, so that the desirable aminated copolymers can hardly be obtained.

The amine used in the present invention includes secondary amines such as dialkylamines, i.e. diethylamine, dipropylamine, di-n-butylamine and the like. Those other than the secondary amines, for example, monoalkylamines, i.e. propylamine, n-butylamine, sec-hexylamine and the like, are also used. Of these, diethylamine is preferred.

The lower alcohol used in the present invention includes those having 1 to 6 carbon atoms, for example, methanol, ethanol, n-butanol, isopropanol and the like. Among them, methanol and ethanol are preferred. These alcohols may be used alone or in combination.

The mixed solvent of the amine and the lower alcohol as a reaction medium is used in an amount of 1 to 100 parts by weight, preferably 2 to 50 parts by weight, based on 1 part by weight of the ethylene-glycidyl acrylates copolymers. When the amount is less than 1 part by weight, it becomes difficult to stir the reaction system and to dip the copolymer to be aminated into the mixed solvent, and therefore a uniform amination cannot be effected. While, when the amount exceeds 100 parts by weight, the amount of aminated copolymer separated is too small in proportion to that of mixed solvent, which is not advantageous industrially and economically.

The amination temperature in the present invention is not particularly limited. It can be selected industrially advantageously taking into account the melting points (referred to as Tm) of the ethylene-glycidyl acrylates copolymers and the rate of amination, but usually a temperature higher than 40° C., preferably higher than a temperature calculated by the formula, $(Tm-10)°$ C., but not higher than 150° C. is suitable. When the amination is carried out at a temperature higher than the temperature calculated by the above formula, the resulting aminated copolymers are in the form of powder even when the starting copolymers in the form of granule or pellet are employed, and moreover the amination time can be shortened.

The ethylene-glycidyl acrylates copolymers can be produced by a reaction between ethylene and glycidyl acrylates according to a known method. For example, they are produced by the method disclosed in Japanese Patent Kokai No. 23490/1972, wherein the reaction is carried out at a high temperature such as 195° C. and under a high pressure such as 1300 atm.

The glycidyl acrylates include glycidyl acrylate, glycidyl methacrylate and the like.

A content of the glycidyl acrylates in the copolymer is 15 to 35% by weight, and the melt index of the copolymer is 10 to 800 g/10 min. When the copolymers have a glycidyl acrylates content of less than 15% by weight, the resulting aminated copolymers do not substantially contribute to an improvement in dyeability within a limited amount thereof. The amount of the aminated copolymer is limited due to the fact that it is increased with deterioration of the mechanical properties inherent to the polyolefin in spite of increase of the dyeability. While, it is difficult to obtain copolymers having a glycidyl acrylates content exceeding 35% by weight, and moreover, if produced, the resulting aminated copolymers are extremely low in compatibility with polyolefins.

The value of melt index is associated with the molecular weight of the copolymer. But if the value is within the range of 10 to 800 g/10 mins, the aminated copolymers resulting from amination of the copolymer are easily mixed with the polyolefin, forming almost uniform polyolefin compositions.

The ethylene-glycidyl acrylates copolymers of the present invention also include a copolymer of ethylene, the glycidyl acrylates and other monomers copolymerizable with both ethylene and the glycidyl acrylates, for example, vinyl acetate, acrylic esters or methacrylic esters, in the amount of about 10% by weight or less based on the copolymer.

The copolymers to be aminated of the present invention may be in any form, usually in the form of a powder, granule or pellet due to the manufacturing process thereof.

In the method of the present invention, the amination is conducted to the extent that 90% or more of the epoxy groups present in the copolymer is aminated. When the degree of amination is less than 90%, the amount of amino group introduced into the copolymer is insufficient, and this leads to the following undesirable results: Firstly, polyolefin compositions comprising the polyolefin and such aminated copolymer have not such a high affinity to dye as to be applicable commercially; secondly, when such the aminated copolymer is dried after the separation from the mixed solvent by filtration, it easily crosslinks, and then becomes hardened, due to heat on drying.

After completion of the amination, the aminated copolymer is separated from the mixed solvent by filtration, and then dried. The mixed solvent separated as a filtrate can be reused for the amination after adjusting the volume ratio of the amine to the lower alcohol to the above defined one. Further, the amine and lower alcohol generated as a gas on drying can also be reused by condensing them by cooling. As described above, since the mixed solvent as a reaction medium can be recycled, the method of the present invention can be applied as a non-pollution process which discharges no injurious matter out of the system on production.

The dyeable polyolefin compositions of the present invention are obtained by mixing the aminated copolymers of the present invention and polyolefin. The polyolefin includes polyethylene, polypropylene, polybutene-1, poly-4-methylpentene-1 and the like. Particularly, polypropylene can further be increased in commercial value by the present invention.

In carrying out the mixing of the polyolefin and the aminated copolymers to obtain the polyolefin compositions of good dyeability, the aminated copolymer is used in an amount of 5 to 13% by weight based on the weight of the polyolefin, and the nitrogen content of the compositions is adjusted to 0.1 to 0.4% by weight, preferably 0.15% by weight or more.

When the amount of aminated copolymer is less than 5% by weight based on the weight of the polyolefin, the dye-affinity of polyolefin composition is not so much increased as to be of a practical value. While the amount exceeds 13% by weight, the dye-affinity becomes higher but the excellent properties inherent to the polyolefin tends to be lowered.

The mixing can easily be carried out mechanically. For example, the mixing is carried out on a roll with heating using suitable mixing equipments such as Banbury mixer and the like, or it is carried out by the multi-extrusion technique combining a mixing function. A conventional stabilizer for the polyolefin and aminated copolymer can be added during or prior to the mixing. The stabilizer includes antioxidants such as alkylphenol compounds, ultraviolet absorbers such as benzophenone derivatives, heat stabilizers such as thioether type compounds of carboxylic esters and additives such as metallic salts of higher fatty acids.

The polyolefin compositions thus obtained in accordance with the present invention have such characteristic features that they are almost uniform and have a high affinity to dyes with substantially no deterioration of the excellent mechanical properties inherent to the polyolefin.

The compositions of the present invention have a high affinity to acid dyes, metal complex dyes, chrome dyes and other anionic dyes, and particularly a high affinity to acid dyes.

The uniformity of the compositions can be evaluated by a degree of difference between the mechanical strengths of the processed goods and those of polyolefin per se. For example, when the composition of the present invention comprising polypropylene and the aminated copolymer of 10% by weight based on the polypropylene, and the polypropylene alone are each spun into fiber under the same conditions, a practical difference between the strengths of the two fibers is not observed. While a known polypropylene composition containing additives in such amount is usually deteriorated by 10% or more in the strength. The compositions of the present invention are also superior in processability and particularly they cause no fiber breakage nor fiber unevenness in fiber-making.

As described above, the compositions of the present invention are improved in dyeability without deterioration of the excellent mechanical properties inherent to the polyolefin. Further, the present compositions exhibit an improved printability when they are formed into films or other articles having a large surface area and printed with dyes or inks. Generally, the polyolefin is an insulator against electricity and is charged by rubbing and therefore it is undesirable for some uses. But the compositions of the present invention are greatly improved in this drawback so that they are not charged markedly.

the present invention will be illustrated with reference to the following examples. In the examples, the melt index was measured under the load of 2160 g at the measuring temperature of 190° C. according to JIS K 6766 (1966), and expressed in terms of the amount extruded for a period of 600 seconds, and the rate of conversion of the epoxy groups in the copolymer are measured according to the conventional titration analysis and infrared absorption spectrography.

EXAMPLE 1

To a 30 l autoclave was added 1.0 kg of a pelletized ethylene/glycidyl methacrylate copolymer having a glycidyl methacrylate content of 21.0% by weight, a melt index of 250 and melting point of 86.1° C. Six liters (at 20° C.) of diethylamine and 4 liters (at 20° C.) of methanol were then added thereto, and after flushing with nitrogen gas amination was carried out at 80° C. for 3 hours. After the reaction mixture was cooled to room temperature, the powdery amination product was collected by means a small centrifuge and dried under 10 mmHg at 60° C. for 3 hours. A content of volatile materials in the aminated copolymer was 0.3% by weight. The rate of conversion of the epoxy groups in the copolymer was 99%. This aminated copolymer had a melt index of 250 and was completely soluble in hot xylene of 13° C.

This powdery aminated copolymer was added to polypropylene in a proportion of 10% by weight based on the polypropylene and mixed at 220° C. in a small mixer. The mixture was formed into an inflation film at 200° C., which was, in turn, drawn to five times as long as its original length at 130° C. to obtain a split yarn.

The yarn was dipped in a bath (pH 2) containing Suminol Milling Scarlet R (trademark of an acid dye produced by Sumitomo Chemical Company, Limited) and sulfuric acid in an amount of 2% and 5% by weight, respectively, based on the weight of the yarn. The dyeing was carried out at 100° C. for 1 hour at a bath ratio of 100 : 1 to obtain a thick red yarn.

EXAMPLES 2 TO 7 AND COMPARATIVE EXAMPLES 1 AND 2

According to a manner similar to that of Example 1, each ethylene-glycidyl acrylates copolymer shown in the following Table was aminated under conditions as shown in the Table to obtain each powdery aminated copolymer. Each aminated copolymer was completely dissolved in hot xylene, and gave each thick red dyeing in the same manner for dyeing polypropylene as in Example 1.

For comparison (Comparative Examples 1 and 2), the amination was repeated, provided that the volume ratio of secondary amines to lower alcohols was outside the scope of Claims of the present invention. The resulting products were of the form of block and gel, respectively, and difficultly separated by centrifuge, and contained a large amount of matters insoluble in hot xylene. Each product was mixed with polypropylene in an amount of 10% by weight, and the mixture was formed into an inflation film at 200° C. with occurrence of fish-eyes. It was not able to draw the film at 130° C. because a film-cut occurred.

Table

| Example No. | Ethylene-glycidyl acrylates copolymers | | | | Secondary amine | | Lower alcohol | |
|---|---|---|---|---|---|---|---|---|
| | Co-monomer (wt %) | Melt index | Melting point (°C.) | Amount (kg) | Kind | Amount (l) | Kind | Amount (l) |
| 1 | GMA[2] 21 | 250 | 86.1 | 1.0 | di-ethyl-amine | 6.0 | methanol | 4.0 |
| 2 | GMA 31 | 460 | 76.8 | 0.2 | di-ethyl-amine | 6.0 | ethanol | 14.0 |
| 3 | GMA 20 | 32 | 90.2 | 3.0 | di-ethyl- | 5.0 | methanol | 5.0 |

Table -continued

| Example No. | | | | | Se. amine | | | |
|---|---|---|---|---|---|---|---|---|
| 4 | GMA 21 | 120 | 87.3 | 2.0 | amine di-propyl-amine | 6.0 | eth-anol | 4.0 |
| 5 | GMA 32 | 180 | 77.6 | 0.5 | di-ethyl amine | 4.0 | eth-anol | 6.0 |
| 6 | GA[3] 17 | 120 | 91.5 | 2.0 | di-ethyl amine | 7.0 | meth-anol | 3.0 |
| 7 | GMA21 VA[4]5 | 170 | 77.5 | 3.0 | di-ethyl amine | 6.0 | meth-anol | 4.0 |
| Comparative 1 | GMA 21 | 250 | 86.1 | 1.0 | di-ethyl amine | 0.3 | meth-anol | 9.7 |
| Comparative 2 | GMA 21 | 250 | 86.1 | 1.0 | di-ethyl amine | 9.6 | meth-anol | 0.4 |

| Example No. | Se. amine Lower alcohol (by vol.) | Copolymer Mixed solvent (by weight) | Reaction condition Temperature (°C.) | Time (hr) | Conversion of epoxy groups (%) | Melt index | Content of volatile matter (wt %) | Form of aminated product |
|---|---|---|---|---|---|---|---|---|
| 1 | 60/40 | 1/7.4 | 80 | 3 | 99 | 250 | 0.3 | powder |
| 2 | 30/70 | 1/76.5 | 75 | 3 | 99 | 458 | 0.4 | powder |
| 3 | 50/50 | 1/2.5 | 83 | 2 | 98 | 30 | 0.2 | powder |
| 4 | 60/40 | 1/3.7 | 85 | 3 | 99 | 118 | 0.4 | powder |
| 5 | 40/60 | 1/15.0 | 85 | 2 | 99 | 180 | 0.3 | powder |
| 6 | 70/30 | 1/3.6 | 87 | 3 | 99 | 117 | 0.3 | powder |
| 7 | 60/40 | 1/2.5 | 80 | 3 | 99 | 170 | 0.4 | powder |
| Comparative 1 | 3/97 | 1/7.9 | 80 | 3 | 70 | — | 12.0 | block |
| Comparative 2 | 96/4 | 1/7.1 | 80 | 3 | 30. | — | 0.8 | gel |

Note
[1] drying condition: 60° C., 10 mmHg, 3 hr.
[2] GMA: glycidyl methacrylate
[3] GA: glycidyl acrylate
[4] VA: vinyl acetate

EXAMPLE 8

To a 3 l four-necked separable flask was added 100 g of a powdery ethylene/glycidyl methacrylate copolymer having a glycidyl methacrylate content of 21.2% by weight and a melt index of 250. A mixture of 600 ml of diethylamine and 400 ml of methanol was then added thereto, and amination was carried out at 60° C. for 3 hours during which the heterogeneous reaction mixture was stirred under reflux with a slight passage of nitrogen gas. After the reaction was finished, the reaction product was collected on a glass filter by filtration and dried in vacuo at 50° C. for 8 hours to obtain the aminated copolymer.

The rate of conversion of the epoxy groups in the copolymer was 97%. This aminated copolymer had a melt index of 55 and was completely soluble in hot xylene at 130° C.

The aminated copolymer produced was added to polypropylene powder in a proportion of 10% by weight based on the polypropylene. The mixture was formed into filament at 230° C. by the extrusion process, drawn to four times as long as its original length in a hot water bath and heat treated at 120° C. for 30 minutes to obtain fibers. The fibers had a nitrogen content of 0.20% by weight.

The fibers thus obtained had a strength of 407 g/d and a draw ratio of 429%. Separately from this, polypropylene containing no aminated copolymer was spun and drawn into fibers under the same conditions. The fibers according to the present invention showed no reduction in strength owing to the mixed spinning, in comparison with the properties (strength 415 g/d, draw ratio 503%) of the 100% polypropylene fibers as a reference.

The fibers were dyed at 100° C. for 1 hour from a dyeing bath (bath ratio 50 : 1) containing 3% of the weight of the fiber (hereinafter referred to o.w.f.) of Aminyl Yellow E-3GL (registered trade mark of Color Index No. A Yellow 49, produced by Sumitomo Chemical Company, Limited), 5% o.w.f. of sulfuric acid and 5% o.w.f. of a nonionic surface active agent. As a result, the fibers were dyed bright yellow. The fastnesses of the dyed fibers to light, washing and rubbing were each 5 in rating according to JIS. The fastness thereof to dry cleaning was tested using perchloroethylene and it was found to be 5 in rating according to JIS. Further, by the microscopic observation of the cross section of the dyed fibers, it was found that the fibers were uniformly dyed with the dye.

The foregoing mixture of the aminated copolymer and polypropylene, and polypropylene alone containing no aminated copolymer were each formed into a test plate of 38 mm ×33 mm ×1 mm in size. Each test plate was rubbed with cotton linen and it was found that the 100% polypropylene plate had a charge quantity of $-7.8\times10^3$ volt, while that the plate of the mixture had a charge quantity of $-3.2\times10^3$ volt.

EXAMPLE 9

To a 30 l autoclave was added 0.2 kg of a granular ethylene/glycidyl methacrylate copolymer having a glycidyl methacrylate content of 30.5% by weight and a melt index of 457 g/10 minutes. Six liters of diethylamine and 14 liters of ethanol were then added thereto, and amination was carried out at 65° C. for 3 hours during which the reaction mixture was stirred with a slight passage of nitrogen gas. Thereafter, the procedure was carried out in the same manner as in Example 8 to obtain the aminated copolymer.

The rate of conversion of the epoxy groups in the copolymer was 96%. This aminated copolymer had a melt index of 78 g/10 minutes and was completely soluble in hot xylene of 130° C.

The aminated copolymer produced was added to polypropylene powder in a proportion of 7% by weight based on the polypropylene. The mixture was formed into filament at 210° C. by the extrusion process, drawn to four times as long as its original length in a hot water bath and heat treated at 120° C. for 30 minutes to obtain fibers. The fibers were dyed at 100° C. for 1 hour from a dyeing bath (bath ratio 50 : 1) containing 3% o.w.f. of Aminyl Blue E-PRL (registered trade mark of Color Index No. A. Blue 129, produced by Sumitomo Chemical Company, Limited), 5% o.w.f. of sulfuric acid and 5% o.w.f. of a nonionic surface active agent. As a result, the fibers of deep blue color were obtained. The fastnesses of the dyed fibers to light, washing and dry cleaning were each 5 in rating according to JIS.

EXAMPLE 10

To a 30 l autoclave was added 700 g of a granular ethylene/glycidyl acrylate copolymer having a glycidyl acrylate content of 17.3% by weight and a melt index of 117 g/10 minutes. Five liters of diethylamine and 5 l of methanol were then added thereto, and amination was carried out at 60° C. for 3 hours during which the reaction mixture was stirred under reflux with a slight passage of nitrogen gas. Thereafter, the procedure was carried out in the same manner as in Example 8 to obtain the aminated copolymer.

The rate of conversion of the epoxy groups in the copolymer was 95%. This aminated copolymer had a melt index of 17 g/10 minutes and was completely soluble in hot xylene of 130° C.

The aminated copolymer produced was added to high-density polyethylene in a proportion of 12% by weight based on the polyethylene. This mixture was formed into film of 50 $\mu$ thick by pressing. When this film was dyed in the same manner as in Example 8, it was dyed a bright yellow. The fastnesses of the dyed film to light, washing and dry cleaning were each 5 in rating according to JIS.

EXAMPLE 11

An aminated copolymer was obtained in the same manner as in Example 1.

The aminated copolymer was added to polypropylene powder in a proportion of 9% by weight based on the polypropylene. The mixture was formed into film as usual by the extrusion process, followed by stretching and splitting. When the split fibers were dyed in the same manner as in Example 8, they were dyed a bright yellow.

EXAMPLE 12

The aminated terpolymer produced in Example 7 and polypropylene were mixed and formed into fibers in the same manner as in Example 8.

When the fibers thus obtained were dyed in the same manner as in Example 8, they were dyed a bright yellow.

EXAMPLE 13

The aminated copolymer produced in Example 4 and polypropylene were mixed and formed into fibers in the same manner as in Example 8.

When the fibers thus obtained were dyed in the same manner as in Example 8, they were dyed a bright yellow.

COMPARATIVE EXAMPLE 3

To a 3 l four-necked separable flask was added 30 g of a granular ethylene/glycidyl methacrylate copolymer having a glycidyl methacrylate content of 21.2% by weight and a melt index of 250 g/10 minutes, and 700 ml of xylene was added thereto. The resulting mixture was heated at 120° C. for 30 minutes to completely turn into a homogeneous solution. After the temperature was lowered to 60° C. and 300 ml of diethylamine was added, amination was carried out at 60° C. for 3 hours during which the reaction solution was stirred under reflux with a slight passage of nitrogen gas. After the reaction was finished, 7 l of methanol was added to precipitate the aminated copolymer which was then collected on a glass filter by filtration and washed with 2 l of methanol. Thereafter, the procedure was carried out in the same manner as in Example 8 to obtain the aminated copolymer.

This aminated copolymer was dipped in hot xylene of 130° C. for 1 hour, but it was hardly dissolved.

Spinning was tried in the same manner as in Example 8, but it was not successful.

COMPARATIVE EXAMPLE 4

In the same manner as in Example 8, an aminated product was obtained from 75 g of a granular ethylene/glycidyl methacrylate copolymer having a glycidyl methacrylate content of 10.0% by weight and a melt index of 105 g/10 minutes.

The rate of conversion of the epoxy groups in the copolymer was 96% and the melt index of the aminated copolymer was 25 g/10 minutes.

This aminated copolymer was added to polypropylene powder in a proportion of 10% by weight based on the polypropylene. The mixture was formed into filament at 230° C. by the extrusion process, drawn to four times as long as its original length in a hot water bath and heat treated at 120° C. for 30 minutes to obtain fibers. The fibers had a nitrogen content of 0.09% by weight.

The fibers thus obtained were dyed in the same manner as in Example 8, but they could not be dyed a bright yellow.

COMPARATIVE EXAMPLE 5

An aminated copolymer was obtained in the same manner in as Comparative Example 4. This aminated copolymer was added to polypropylene powder in proportion of 23% by weight based on the polypropylene.

The mixture was tried to make fibers in the same manner as in Example 8, but it was impossible.

What is claimed is:

1. A method for producing aminated ethylene-glycidyl acrylates copolymers by amination of ethyleneglycidylacrylates copolymers, which comprises conducting the amination in a heterogeneous system comprising the ethyleneglycidyl acrylates copolymers and a mixed solvent of a secondary amine amine and a lower alcohol, to the extent that not less than 90% of epoxy groups present in the copolymer are aminated, the volume ratio of the amine to the alcohol in the mixed solvent being 20/80 to 85/15, and the amount of the mixed solvent being 1 to 100 parts by weight of the copolymer.

2. A method according to claim 1, wherein said amine is one member selected from the group consisting of dialkylamines and monoalkylamines.

3. A method according to claim 1, wherein said amine is a dialkylamine selected from the group consisting of diethylamine, dipropylamine and di-n-butylamine, dipropylamine and di-n-butylamine.

4. A method according to claim 1, wherein said lower alcohol is one having 1 to 6 carbon atoms.

5. A method according to claim 1, wherein said lower alcohol is methanol or ethanol.

6. A method according to claim 1, wherein the copolymer is a copolymer of ethylene and glycidyl methacrylate.

7. A method according to claim 1, wherein a content of the glycidyl acrylates in the said copolymer is 15 to 35% by weight.

8. A method according to claim 1, wherein the amination is conducted at a temperature higher than a temperature calculated by the formula, $(T_m - 10)°$ C., wherein $T_m$ is a melting point of the ethylene-glycidyl acrylates copolymers.

* * * * *